(12) United States Patent
Bahrainwala et al.

(10) Patent No.: US 11,068,833 B2
(45) Date of Patent: Jul. 20, 2021

(54) DELIVERY SECURITY FOR A PARKED VEHICLE

(71) Applicant: TOYOTA JIDOSHA KABUSHIKI KAISHA, Toyota (JP)

(72) Inventors: Shazaan Bahrainwala, Mountain View, CA (US); Divya Toopran, Mountain View, CA (US); Dustin Harber, Mountain View, CA (US); Tim Falkenmayer, Mountain View, CA (US); Hidenobu Suzuki, Toyota (JP)

( * ) Notice: Subject to any disclaimer, the term of this patent is extended or adjusted under 35 U.S.C. 154(b) by 609 days.

(21) Appl. No.: 15/640,447

(22) Filed: Jun. 30, 2017

(65) Prior Publication Data

US 2019/0005445 A1 Jan. 3, 2019

(51) Int. Cl.
G06Q 10/08 (2012.01)
G07C 9/00 (2020.01)
A47G 29/14 (2006.01)

(52) U.S. Cl.
CPC ....... *G06Q 10/0833* (2013.01); *A47G 29/141* (2013.01); *G06Q 10/08* (2013.01); *G06Q 10/083* (2013.01); *G06Q 10/0835* (2013.01); *G06Q 10/08355* (2013.01); *G07C 9/00182* (2013.01); *G07C 9/00896* (2013.01); *A47G 2029/144* (2013.01); *G07C 9/00571* (2013.01); *G07C 2009/0092* (2013.01); *G07C 2009/00769* (2013.01); *G08C 2201/90* (2013.01); *G08C 2201/93* (2013.01)

(58) Field of Classification Search
CPC ................ G06Q 10/08; G07C 9/00182; G07C 9/00896; G07C 9/00571; G07C 2009/00769; G07C 2009/0092; A47G 2029/144
See application file for complete search history.

(56) References Cited

U.S. PATENT DOCUMENTS

| 2007/0257774 | A1* | 11/2007 | Stumpert | G06Q 10/08 340/7.1 |
| 2016/0098870 | A1* | 4/2016 | Bergerhoff | G07C 9/00007 340/5.61 |
| 2017/0230831 | A1* | 8/2017 | Canis | G06Q 10/083 |

(Continued)

FOREIGN PATENT DOCUMENTS

JP POH10-257960 9/1998

OTHER PUBLICATIONS

Synesis Partners LLC, "5.9 GHz Dedicated Short Range Communication Vehicle-based Road and Weather Condition Application Messaging Requirements," University of Virginia, Final Version 2, Published Aug. 2013, Accessed Mar. 2021, URL: (Year: 2013).*

(Continued)

Primary Examiner — Scott M Tungate
(74) Attorney, Agent, or Firm — Burbage Law, P.C.; Jon-Michael Burbage; Elizabeth Ruzich

(57) ABSTRACT

The disclosure includes embodiments for providing secure package delivery for a vehicle. In some embodiments, a method includes receiving, by a Dedicated Short Range Communication radio (a DSRC radio) of a vehicle, a DSRC message. In some embodiments, the method includes unlocking a trunk of the DSRC-equipped vehicle responsive to receiving the DSRC message by the DSRC radio.

20 Claims, 7 Drawing Sheets

(56) References Cited

U.S. PATENT DOCUMENTS

2019/0244172 A1* 8/2019 Carrier .................. G06Q 10/083
2019/0311327 A1* 10/2019 Habbaba ................. H04W 4/44

OTHER PUBLICATIONS

[Citation U Contiued] http://www.cts.virginia.edu/wp-content/uploads/2014/04/PFS_DSRC02_Task1_Messaging_Reqs_007-101-02.pdf(Year: 2013).*

* cited by examiner

300

```
┌─────────────────────────────────────────────────────────────────────────────┐
│ Delivery notification system transmits a wireless message to the network.   │
│ The message includes notification data describing one or more of the        │
│ following: an expected vehicle ID; a time period for the delivery; the      │
│ weight of the package; and an image of the courier who operates the         │
│ delivery vehicle and will deliver the package (e.g., from their employee    │
│ identification badge); and a license plate number of the delivery vehicle.  │
│ 301                                                                         │
└─────────────────────────────────────────────────────────────────────────────┘
                                      ↓
┌─────────────────────────────────────────────────────────────────────────────┐
│ Delivery security system notifies the delivery notification system about    │
│ the location of the parked vehicle at the time of the delivery so that the  │
│ courier can more easily locate the parked vehicle. This notification can    │
│ be, for example, by email or text message to the courier's smartphone.      │
│ Because the parked vehicle is DSRC-enabled and includes a DSRC-compliant    │
│ GPS unit, the GPS data describing the location of the parked vehicle is     │
│ accurate to within plus or minus 1.5 meters of the actual location of the   │
│ parked vehicle in the real world, thereby enabling the courier to identify  │
│ the exact parking space of the parked vehicle in a parking lot (e.g.,       │
│ because parking spaces are 3 meters wide, and the accuracy of the GPS       │
│ data is plus or minus 1.5 meters). 303                                      │
└─────────────────────────────────────────────────────────────────────────────┘
                                      ↓
┌─────────────────────────────────────────────────────────────────────────────┐
│ Delivery security system notifies the delivery notification system about    │
│ the license plate number of the parked vehicle so that the courier can      │
│ verify the identity of the parked vehicle by looking at the license plate.  │
│ 305                                                                         │
└─────────────────────────────────────────────────────────────────────────────┘
                                      ↓
┌─────────────────────────────────────────────────────────────────────────────┐
│ Delivery security system monitors for a BSM message (or some other DSRC     │
│ message) from the delivery vehicle. 307                                     │
└─────────────────────────────────────────────────────────────────────────────┘
                                      ↓
┌─────────────────────────────────────────────────────────────────────────────┐
│ Delivery security system receives BSM message from the delivery vehicle.    │
│ 308                                                                         │
└─────────────────────────────────────────────────────────────────────────────┘
                                      ↓
┌─────────────────────────────────────────────────────────────────────────────┐
│ Delivery security system parses the received vehicle ID from the BSM data.  │
│ Optionally, the delivery security system parses the GPS data and timestamp  │
│ data for the delivery vehicle; this information may be used to further      │
│ verify the identity of the delivery vehicle from the BSM data. For          │
│ example, the actual latitude/longitude of the delivery vehicle at a         │
│ specified time may be known and provided by the delivery notification       │
│ system, and this may be compared to the GPS data and timestamp data         │
│ included in the BSM message as an additional layer of authentication. 309   │
└─────────────────────────────────────────────────────────────────────────────┘
                                      ↓
┌─────────────────────────────────────────────────────────────────────────────┐
│ Delivery security system compares the received vehicle ID to the expected   │
│ vehicle ID, and if they match, the delivery security system authenticates   │
│ the courier. 311                                                            │
└─────────────────────────────────────────────────────────────────────────────┘
                                      ↓
                                     (A)
```

Figure 3A

BSM DATA 195

- Vehicles and other client devices equipped with Dedicated Short Range Communication ("DSRC") transmit a Basic Safety Message ("BSM") at a regular interval.

- Each BSM includes the following BSM data describing one or more of the following for the vehicle that originally sent the BSM:
    (1) GPS Data Describing the Location of the Vehicle, where the GPS Data may be so accurate that it describes the specific parking space the Vehicle is parked in;
    (2) Heading Data Describing a past Direction of travel for the Vehicle, if any;
    (3) Velocity Data Describing a past Velocity of the Vehicle; and
    (4) Path History of Vehicle (e.g., path history data).

Figure 4A

BSM DATA 195

Part 1
GPS Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle type

Figure 4B

DELIVERY SECURITY FOR A PARKED VEHICLE

BACKGROUND

The specification relates to delivery security for a parked vehicle.

Couriers frequently leave packages outside of homes. It is common for packages to be stolen when they are left outside in this manner.

SUMMARY

Described herein is a delivery security system of a vehicle which enables packages to be securely delivered to the vehicle's trunk when the vehicle is parked (i.e., a "parked vehicle"). The identity of a courier is verified by the delivery security system based on their delivery vehicle. For example, both the parked vehicle and the delivery vehicle are DSRC-equipped vehicles. A DSRC-equipped vehicle is a vehicle which includes a DSRC radio and a DSRC-compliant GPS unit. DSRC-equipped vehicles broadcast a Basic Safety Message ("BSM message") at regular intervals (e.g., once every 0.1 seconds or some other interval which is user configurable). Each BSM message includes BSM data that describes the vehicle which broadcasted the BSM message. The BSM data is digital data that describes, among other things, a unique identifier of the vehicle which broadcasted the BSM message. The parked vehicle receives an electronic message including a notification that a delivery will occur and an expected vehicle identifier (an "expected vehicle ID") for the delivery. The delivery security system stores the expected vehicle ID in a non-transitory memory of the parked vehicle. The delivery vehicle arrives and automatically broadcasts a BSM message. The parked vehicle receives the BSM message and the delivery security system parses the unique identifier from the BSM data of the BSM message; this unique identifier is referred to herein as a "received vehicle ID"). The delivery security system compares the received vehicle ID to the expected vehicle ID, and temporarily unlocks the trunk of the parked vehicle for a predetermined period of time if the received vehicle ID and the expected vehicle ID match. The predetermined period of time is operable to provide enough time for the courier to deliver the package without leaving the unlocked trunk vulnerable to theft.

In some embodiments, the electronic message including the notification that the delivery will occur includes digital data describing a weight of the package that will be delivered. In these embodiments, the delivery security system beneficially includes a scale installed in the parked vehicle which is operable to measure the weight of the objects in the trunk both prior to the delivery of the package and subsequent to the delivery of the package, and the delivery security system monitors these weight measurements to ensure that objects are not stolen from the trunk of the parked vehicle (e.g., by the courier or some other individual who may access the trunk while it is temporarily unlocked). If a theft occurs, then the courier service which employs the courier may be notified. One or more of the driver of the parked vehicle and the courier may also be notified.

Accordingly, the delivery security system beneficially: (1) verifies an identity of the courier based on the BSM data transmitted by the delivery vehicle which is operated by the courier; (2) temporarily unlocks the trunk of the parked vehicle for a predetermined period of time so that the trunk of the parked vehicle can be utilized for secure package delivery by couriers; and (3) monitors the weight of the trunk so that the courier, or others, cannot steal from the trunk of the parked vehicle.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: receiving, by a Dedicated Short Range Communication ("DSRC") radio of a DSRC-equipped vehicle, a DSRC message; and unlocking, by an electronic trunk lock of the DSRC-equipped vehicle, a trunk of the DSRC-equipped vehicle responsive to receiving of the DSRC message. Other embodiments of this aspect include corresponding computer systems, apparatus, and computer programs recorded on one or more computer storage devices, each configured to perform the actions of the methods.

Implementations may include one or more of the following features. The method where the DSRC message is not one of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. The method where the DSRC message is transmitted by a second DSRC radio of a second vehicle. The method where the second vehicle is a delivery vehicle which is DSRC-equipped. The method where the DSRC message includes digital data describing a received identifier. The method further including: comparing the received identifier to an expected identifier of a delivery vehicle to determine whether the DSRC message was transmitted by the delivery vehicle; and unlocking the trunk of the DSRC-equipped vehicle responsive to the comparing indicating that the received identifier matches the expected identifier which verifies that the DSRC message was transmitted by the delivery vehicle. The method where the unlocking is temporary and further including re-locking the trunk after an expiration of a predetermined period of time. The method where the DSRC-equipped vehicle is parked. The method further including weighing the trunk after unlocking the trunk to determine whether the trunk weighs less after unlocking the trunk. The method further including transmitting a message to a computing device of a driver of the vehicle to cause the computing device to provide a notification to the driver that the trunk is unlocked. Implementations of the described techniques may include hardware, a method or process, or computer software on a computer-accessible medium.

One general aspect includes a system including: a DSRC radio of a vehicle; an electronic trunk lock operable to lock and unlock a trunk of the vehicle an onboard unit of the vehicle that is communicatively coupled to the DSRC radio and the electronic trunk lock, the onboard unit including a non-transitory memory storing computer code which, when executed by the onboard unit causes the onboard unit to execute steps including: receiving, by the DSRC radio, a DSRC message; and providing instructions to the electronic trunk lock to unlock the trunk of the vehicle responsive to receiving the DSRC message by the DSRC radio of the vehicle. Other embodiments of this aspect include corresponding computer systems, apparatus, and computer programs recorded on one or more computer storage devices, each configured to perform the actions of the methods.

Implementations may include one or more of the following features. The system where the DSRC message is transmitted by a second DSRC radio of a second vehicle. The system where the second vehicle is a delivery vehicle. The system where the DSRC message includes digital data describing a received identifier. The system further including additional computer code stored on the non-transitory memory which, when executed by the onboard unit causes the onboard unit to execute additional steps including: comparing the received identifier to an expected identifier of a delivery vehicle to determine whether the DSRC message was transmitted by the delivery vehicle; and unlocking the trunk of the vehicle responsive to the comparing indicating that the received identifier matches the expected identifier which verifies that the DSRC message was transmitted by the delivery vehicle. Implementations of the described techniques may include hardware, a method or process, or computer software on a computer-accessible medium.

One general aspect includes a non-transitory memory encoded with a computer program, the computer program including instructions that, when executed by one or more processors, cause the one or more processors to perform operations including: receiving, by a DSRC radio of a vehicle, a DSRC message; and providing instructions to an electronic trunk lock of the vehicle to unlock a trunk of the vehicle responsive to receiving the DSRC message by the DSRC radio of the vehicle. Other embodiments of this aspect include corresponding computer systems, apparatus, and computer programs recorded on one or more computer storage devices, each configured to perform the actions of the methods.

Implementations may include one or more of the following features. The non-transitory memory where the DSRC message is transmitted by a second DSRC radio of a delivery vehicle. The non-transitory memory where the DSRC message is a Basic Safety Message ("BSM message") that includes a unique identifier of the delivery vehicle which verifies an identity of the delivery vehicle, thereby indicating that the trunk should be unlocked. The non-transitory memory where the DSRC message includes digital data describing a received identifier. The non-transitory memory further including additional instructions stored on the non-transitory memory which, when executed by the one or more processors causes the one or more processors to execute additional operations including: comparing the received identifier to an expected identifier of a delivery vehicle to determine whether the DSRC message was transmitted by the delivery vehicle; and unlocking the trunk of the vehicle responsive to the comparing indicating that the received identifier matches the expected identifier which verifies that the DSRC message was transmitted by the delivery vehicle. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIGS. 3A and 3B are an example flow diagram of a method for opening a trunk of a parked vehicle responsive to receipt of a DSRC message including an identifier of a second vehicle, according to some embodiments.

FIG. 4A is a block diagram illustrating an example of BSM data according to some embodiments.

FIG. 4B is a block diagram illustrating an example of BSM data according to some embodiments.

DETAILED DESCRIPTION

Figure 1:
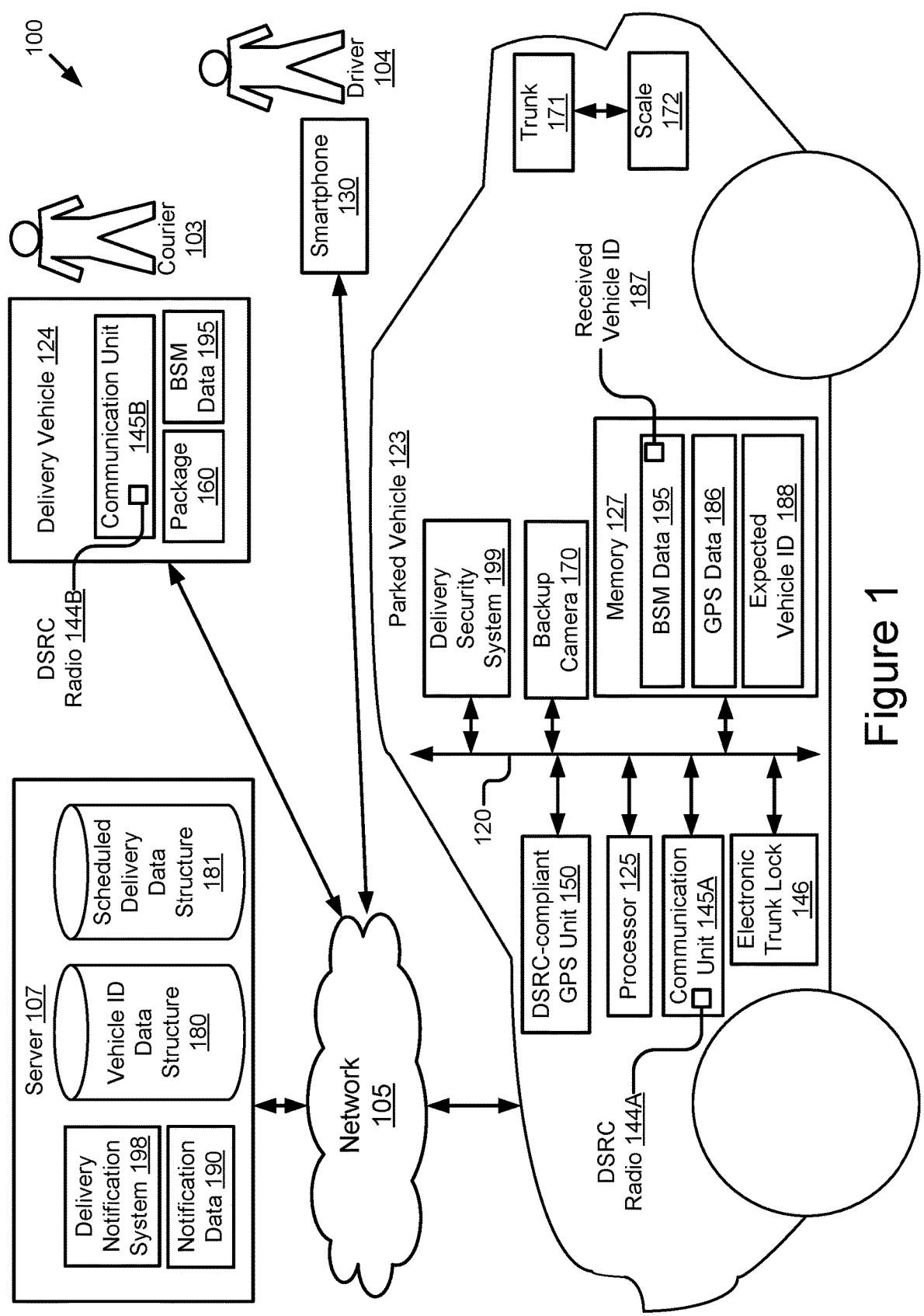
FIG. 1 is a block diagram illustrating an operating environment for a delivery security system according to some embodiments.

A DSRC-equipped vehicle is a vehicle which includes a DSRC radio and is operable to lawfully send and receive DSRC messages in a jurisdiction where the DSRC-equipped vehicle is located. A DSRC radio is hardware that includes a DSRC receiver and a DSRC transmitter, and is operable to wirelessly send and receive DSRC messages.

A DSRC message is a wireless message that is specially configured to be send and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In the United States, Europe and Asia, DSRC messages are transmitted at 5.9 GHz. In the United States, DSRC messages are allocated 75 MHz of spectrum in the 5.9 GHz band. In Europe and Asia, DSRC messages are allocated 30 MHz of spectrum in the 5.9 GHz band. A wireless message, therefore, is not a DSRC message unless it operates in the 5.9 GHz band. A wireless message is also not a DSRC message unless it is transmitted by a DSRC transmitter of a DSRC radio.

Accordingly, a DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

The wireless messages of key fobs made as a component of a remote keyless entry system are not DSRC messages for additional reasons. For example, the payload for a DSRC message is also required to include digital data describing a rich amount of vehicular data of various types of data. In general, a DSRC message always includes, at a minimum, a unique identifier of the vehicle which transmits the DSRC message as well as the GPS data for that vehicle. This amount of data requires a larger bandwidth than what is possible for other types of non-DSRC wireless messages. For example, FIGS. 4A and 4B depict an example of a permissible payload for a particular type of DSRC message referred to as a BSM message. The wireless messages of key fobs as a component of a remote keyless entry system are not DSRC messages because they do not include a payload which is permissible under the DSRC standard. For example, a key fob merely transmits a wireless message including a digital key which is known to a vehicle which is paired with the key fob; there is not sufficient bandwidth for other data to be included in the payload because the bandwidth allocated for these transmissions is very small. By comparison, DSRC messages are allocated large amounts of bandwidth and are required to include a far richer amount of data, including, for example, a unique identifier and the GPS data for the vehicle which transmitted the DSRC message.

In some embodiments, a DSRC-equipped vehicle does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "space-level accuracy" since, for example, a parking space is generally about 3 meters wide, and an accuracy of plus or minus 1.5 meters is sufficient to identify which parking space a vehicle is parked in among many parking spaces in a parking lot.

In some embodiments, a DSRC-compliant GPS unit is operable to identify, monitor and track its two-dimensional position within 1.5 meters of its actual position 68% of the time under an open sky.

Referring to FIG. 1, depicted is an operating environment 100 for a delivery security system 199 according to some embodiments. As depicted, the operating environment 100 includes the following elements: a parked vehicle 123: a smartphone 130 of a driver 104; a delivery vehicle 124 of a courier 103; and a server 107. These elements are communicatively coupled to one another by a network 105.

Although one parked vehicle 123, one smartphone 130, one delivery vehicle 124, one server 107 and one network 105 are depicted in FIG. 1, in practice the operating environment 100 may include one or more parked vehicles 123, one or more smartphones 130, one or more delivery vehicles 124, one or more servers 107 and one or more networks 105.

Although the parked vehicle 123 is referred to as "parked," in some embodiments it is in motion for one or more periods of time. For example, the parked vehicle 123 may be in motion when it receives a wireless message from the network 105 including the notification data 190 described herein. However, the parked vehicle 123 is parked when the courier 103 delivers a package 160 to the parked vehicle 123.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 105 may include one or more IEEE 802.11 wireless networks.

In some embodiments, the parked vehicle 123 and the delivery vehicle 124 are DSRC-equipped vehicles. The network 105 may include a DSRC communication channel shared among the parked vehicle 123 and the delivery vehicle 124.

The parked vehicle 123 is any type of vehicle. For example, the parked vehicle 123 is one of the following types of vehicles: a car; a truck; a sports utility vehicle; a bus; a semi-truck; a drone or any other roadway-based conveyance. The delivery vehicle 124 may be any type of vehicle as well. In some embodiments, the delivery vehicle 124 is a delivery truck.

In some embodiments, one or more of the parked vehicle 123 and the delivery vehicle 124 is an autonomous vehicle or a semi-autonomous vehicle. For example, the parked vehicle 123 includes a set of Advanced Driver Assistance Systems (a set of "ADAS systems") which provide autonomous features to the parked vehicle 123 which are sufficient to render the parked vehicle 123 an autonomous vehicle.

The National Highway Traffic Safety Administration ("NHTSA") has defined different "levels" of autonomous vehicles, e.g., Level 0, Level 1, Level 2, Level 3, Level 4 and Level 5. If an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. The different levels of autonomous vehicles are described briefly below.

Level 0: The set of ADAS systems installed in a vehicle have no vehicle control, but may issue warnings to the driver of the vehicle. A vehicle which is Level 0 is not an autonomous or semi-autonomous vehicle.

Level 1: The driver must be ready to take driving control of the autonomous vehicle at any time. The set of ADAS systems installed in the autonomous vehicle may provide autonomous features such as one or more of the following: Adaptive Cruise Control ("ACC"); and Parking Assistance with automated steering and Lane Keeping Assistance ("LKA") Type II, in any combination.

Level 2: The driver is obliged to detect objects and events in the roadway environment and respond if the set of ADAS systems installed in the autonomous vehicle fail to respond properly (based on the driver's subjective judgement). The set of ADAS systems installed in the autonomous vehicle executes accelerating, braking, and steering. The set of ADAS systems installed in the autonomous vehicle can deactivate immediately upon takeover by the driver.

Level 3: Within known, limited environments (such as freeways), the driver can safely turn their attention away from driving tasks, but must still be prepared to take control of the autonomous vehicle when needed.

Level 4: The set of ADAS systems installed in the autonomous vehicle can control the autonomous vehicle in all but a few environments such as severe weather. The driver must enable the automated system (which is comprised of the set of ADAS systems installed in the vehicle) only when it is safe to do so. When the automated system is enabled, driver attention is not required for the autonomous vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

A highly autonomous vehicle ("HAV") is an autonomous vehicle that is Level 3 or higher.

Accordingly, in some embodiments one or more of the parked vehicle 123 and the delivery vehicle 124 is one of the following: a Level 1 autonomous vehicle; a Level 2 autonomous vehicle; a Level 3 autonomous vehicle; a Level 4 autonomous vehicle; a Level 5 autonomous vehicle; and an HAV.

In some embodiments, the parked vehicle 123 includes the following elements: a processor 125; a memory 127; a communication unit 145A including a DSRC radio 144A; a DSRC-compliant GPS unit 150; a trunk 171; a scale 172; an electronic trunk lock 146; a backup camera 170; and a delivery security system 199. These elements of the parked vehicle 123 are communicatively coupled to one another via a bus 120. Although not depicted as such in FIG. 1, in embodiments that include the scale 172, the scale 172 is communicatively coupled to the bus 120.

In some embodiments, the processor 125 and the memory 127 may be elements of an onboard vehicle computer system (such as computer system 200 described below with reference to FIG. 2). The onboard vehicle computer system may be operable to cause or control the operation of the delivery security system 199. The onboard vehicle computer system may be operable to access and execute the data stored on the memory 127 to provide the functionality described herein for the delivery security system 199 or its elements (see, e.g., FIG. 2). The onboard vehicle computer system may be operable to execute the delivery security system 199 which causes the onboard vehicle computer system to execute one or more of the steps of the method 300 described below with reference to FIGS. 3A and 3B.

In some embodiments, the processor 125 and the memory 127 may be elements of an onboard unit. The onboard unit includes an electronic control unit (herein "ECU") or an onboard vehicle computer system that may be operable to cause or control the operation of the delivery security system 199. The onboard unit may be operable to access and execute the data stored on the memory 127 to provide the functionality described herein for the delivery security system 199 or its elements. The onboard unit may be operable to execute the delivery security system 199 which causes the onboard unit to execute one or more of the steps of the method 300 described below with reference to FIGS. 3A and 3B. In some embodiments, the computer system 200 depicted in FIG. 2 is an example of an onboard unit.

In some embodiments, the DSRC-compliant GPS unit 150 includes any hardware and software necessary to make the parked vehicle 123 or the DSRC-compliant GPS unit 150 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the DSRC-compliant GPS unit 150 is operable to provide GPS data 186 describing the location of the parked vehicle 123 with space-level accuracy. For example, the parked vehicle 123 is parked in a parking space of a parking lot. Space-level accuracy means that the location of the parked vehicle 123 is described by the GPS data 186 so accurately that the parked vehicle's 123 parking space within a parking lot (or some other roadway area that includes parking spaces or areas where vehicles may park) may be accurately determined based on the GPS data 186 for this parked vehicle 123 as provided by the DSRC-compliant GPS unit 150.

In some embodiments, in the context of the delivery security system 199, space-level accuracy enables the delivery security system 199 to optionally provide a courier 103 with a guidance that helps them location the exact parking location of the parked vehicle 123. For example, the courier 103 is carrying a smartphone 130B (see, e.g., FIG. 5) and the delivery security system 199 causes the communication unit 145A to wireless transmit the GPS data 186 for the parked vehicle 123 to the smartphone 130B of the courier so that the smartphone 130B can navigate the courier to the parking space that includes the parked vehicle 123.

In some embodiments, the DSRC-compliant GPS unit 150 includes hardware that wirelessly communicates with a GPS satellite to retrieve GPS data 186 that describes the geographic location of the parked vehicle 123 with a precision that is compliant with the DSRC standard. The DSRC standard requires that GPS data 186 be precise enough to infer if two vehicles (one of which is, for example, the parked vehicle 123) are located in adjacent parking spaces. In some embodiments, the DSRC-compliant GPS unit 150 is operable to identify, monitor and track its two-dimensional position within 1.5 meters of its actual position 68% of the time under an open sky. Since parking spaces are typically no less than 3 meters wide, whenever the two-dimensional error of the GPS data 186 is less than 1.5 meters the delivery security system 199 described herein may analyze the GPS data 186 provided by the DSRC-compliant GPS unit 150 and determine what parking space the parked vehicle 123 is parked in based on the relative positions of two or more different parked vehicles (one of which is, for example, the parked vehicle 123) in a parking lot at the same time.

By comparison to the DSRC-compliant GPS unit 150, a conventional GPS unit which is not compliant with the DSRC standard is unable to determine the location of a vehicle 123 with space-level accuracy. For example, a typical parking space is approximately 3 meters wide. However, a conventional GPS unit only has an accuracy of plus or minus 10 meters relative to the actual location of the parked vehicle 123. As a result, such conventional GPS units are not sufficiently accurate to assist the courier 103 to locate the parking space that includes the parked vehicle 123 since it cannot help the courier to locate the exact parking space of the parked vehicle 123 among many different parking spaces and many different vehicles.

In some embodiments, the parked vehicle 123 may include a sensor set. The sensor set may include one or more sensors that are operable to measure the physical environment outside of the parked vehicle 123. For example, the sensor set may include one or more sensors that record one or more physical characteristics of the physical environment that is proximate to the parked vehicle 123. The memory 127 may store sensor data that describes the one or more physical characteristics recorded by the sensor set. The sensor data may be used by the delivery security system 199 to confirm or deny the GPS data 186 or other data stored in the memory 127. For example, the GPS data 186 may indicate that the parked vehicle 123 is located near a particular landmark, and the sensor data may include a digital image that includes the particular landmark, thereby confirming the accuracy of the GPS data 186.

In some embodiments, the sensor set of the parked vehicle 123 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

A backup camera 170 includes a camera mounted to record images behind the parked vehicle 123. In some embodiments, the images are still images or a movie that are recorded as sensor data which is stored on the memory 127.

In some embodiments, the backup camera 170 is mounted in a position which is operable to record a digital image of the courier 103 as they approach the trunk 171 of the parked vehicle 123. In some embodiments, the backup camera 170 is mounted in a position which is operable to record a digital image of the delivery vehicle 124 when it is parked so that the courier 103 can approach the trunk 171 of the parked vehicle 123.

The trunk 171 is a compartment of the parked vehicle 123 where objects can be placed and stored. The trunk 171 may be on the front of the parked vehicle 123 or the back of the parked vehicle 123. The trunk 171 includes one or more secured walls so that people such as the courier 103 cannot access the cabin of the parked vehicle 123 from the trunk 171.

The electronic trunk lock 146 is a lock which is operable to be locked and unlocked based on one or more electronic signals transmitted by the processor 125 of the parked vehicle 123. The trunk 171 includes a latch. The electronic trunk lock 146 is mounted to the parked vehicle 123 in such a way that it is operable to lock and unlock the trunk 171 using the latch of the trunk 171. For example, the delivery security system 199 includes code and routines that are operable, when executed by the processor 125, to cause the processor 125 to generate an electronic signal which is transmitted to the electronic trunk lock 146 via the bus 120, and the electronic trunk lock 146 receives the electronic signal via the bus 120. The electronic signal is operable to cause the electronic trunk lock 146 to lock or unlock the trunk 171. The electronic trunk lock 146 receives the electronic signal via the bus 120 and locks or unlocks the trunk 171 based on the electronic signal.

In some embodiments, the trunk 171 includes a scale 172. The scale 172 is an electronic sensor which is operable to measure the mass or weight of the objects placed on a floor of the trunk 171. For example, the scale is a digital scale. The scale 172 may be an element of the sensor set. The scale 172 records the measurements as weight data 291. The weight data 291 is digital data that describes the measurements recorded by the scale 172. The weight data 291 is stored in the memory 127. The weight data 291 is described in more detail below with reference to FIGS. 2, 3A and 3B. In some embodiments, the weight data 291 is an example of sensor data stored in the memory 127.

In some embodiments, the scale 172 weighs and tracks the weight of the items in the trunk 171. The weight data 291 collected by the scale 172 beneficially enables the delivery security system 199 to (1) confirm that the package delivered by the courier 103 weighs the expected weight [as described in the wireless message transmitted by the server 107 that includes the notification data 190] and (2) confirm that the courier 103 has not removed any objects [e.g., property of the driver 104] from the trunk 171.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The parked vehicle 123 may include one or more processors 125. Other processors, operating systems, sensors, displays, and physical configurations may be possible.

The memory 127 is a non-transitory memory that stores instructions or data that may accessed and executed by the processor 125. The instructions or data may include code for performing the techniques described herein. The memory 127 may be a dynamic random access memory (DRAM) device, a static random access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random access memory (virtual RAM). The parked vehicle 123 may include one or more memories 127.

The memory 127 of the parked vehicle 123 stores one or more of the following types of digital data: BSM data 195; GPS data 186; and an expected vehicle identifier 188 (an "expected vehicle ID 188"). In some embodiments, the memory 127 stores one or more of the notification data 190 and the weight data 291 depicted in FIG. 2. For example, the server 107 transmits the notification data 190 to the parked vehicle 123 via the network 105 and the delivery security system 199 or the communication unit 145A stores the notification data 190 on the memory 127.

In some embodiments, the memory 127 stores, as digital data, any data described herein. In some embodiments, the memory 127 stores any data that is necessary for the delivery security system 199 to provide its functionality.

The BSM data 195 is digital data that is received in a BSM message. The BSM data 195 is depicted in FIGS. 4A and 4B, and described in more detail below with reference FIGS. 4A and 4B. In some embodiments, the memory 127 stores DSRC data which is digital data received in a DSRC message. The DSRC data describes any information that is included in the BSM data 195. For example, a BSM message is a special type of DSRC message which is transmitted at a regular interval (e.g., once every 0.10 seconds), but the content or payload of a DSRC message (i.e., the DSRC data) is the same as that of a BSM message (i.e., the DSRC data for a DSRC message is the same as or similar to the BSM data for a BSM message).

In some embodiments, the BSM data 195 is received by the parked vehicle 123 in a BSM message which is broadcasted by the delivery vehicle 124. This broadcast may occur at regular intervals.

In some embodiments, the BSM data 195 includes one or more of the following: (1) GPS data 186 for the DSRC-equipped electronic device that transmitted the BSM message which included the BSM data 195 [e.g., the delivery vehicle 124]; and (2) a received vehicle identifier 187 [a "received vehicle ID 187"] for the DSRC-equipped electronic device that transmitted the BSM message which included the BSM data 195 [e.g., the delivery vehicle 124]. The GPS data 186 included in the BSM data 195 describes the geographical location of the vehicle (e.g., the delivery vehicle 124) that transmitted the BSM message which included the BSM data 195. The received vehicle ID 187 is digital data that describes a unique identifier of the vehicle (e.g., the delivery vehicle 124) that transmitted the BSM message which included the BSM data 195. The expected vehicle ID 188 is digital data that describes a unique identifier of the delivery vehicle 124. The parked vehicle 123 receives the expected vehicle ID 188 from the server 107 via the network 105.

As described below, the delivery security system 199 includes code and routines that are operable to compare the received vehicle ID 187 to the expected vehicle ID 188 to determine whether the received vehicle ID 187 matches the expected vehicle ID 188. If the received vehicle ID 187 matches the expected vehicle ID 188, then this indicates that: (1) the expected vehicle, i.e., the delivery vehicle 124, is within DSRC range of the parked vehicle 123 [DSRC range is 300 to 500 meters, depending on variables such as topography and the presence of occluding objects]; and (2) the delivery security system 199 should provide a control signal to the electronic trunk lock 146 to cause the electronic trunk lock 146 to unlock the trunk 171 of the parked vehicle 123.

The GPS data 186 is digital data that describes a geographic location of an object. In some embodiments, the GPS data 186 describes the geographic location of the object with space-level precision.

In some embodiments, the memory 127 one or more instances of the GPS data 186. For example, the memory 127 stores: a first instance of GPS data 186 that describes the geographic location of the parked vehicle 123; and a second instance of GPS data 186 that describes the geographic location of the DSRC-equipped electronic device that transmitted the BSM message which included the BSM data 195 (e.g., the delivery vehicle 124). The first instance of GPS data 186 is retrieved by the DSRC-compliant GPS unit 150 of the parked vehicle 123. The second instance of GPS data 186 is retrieved by a DSRC-compliant GPS unit of the DSRC-equipped electronic device that transmitted the BSM message which included the BSM data 195 (e.g., the delivery vehicle 124).

As described above, the expected vehicle ID 188 is digital data that describes a unique identifier of the delivery vehicle 124. The parked vehicle 123 receives the expected vehicle ID 188 from the sever 107 via the network 105. For example, the delivery notification system 198 of the server 107 identifies a scheduled delivery for the parked vehicle 123 from the scheduled delivery data structure 181, retrieves, from the vehicle ID data structure 180, the expected vehicle ID 188 for the delivery vehicle 124 which will make the scheduled delivery for the parked vehicle 123 and transmits a wireless message to the parked vehicle 123 that includes notification data 190 (see, e.g., step 301 of FIG. 3A). In some embodiments, the notification data 190 is digital data that describes one or more of the following: the expected vehicle ID 188; a time period for the delivery to the parked vehicle 123 by the delivery vehicle 124; the weight of the package being delivered to the parked vehicle 123 [which may itself be a component of the weight data 291 depicted in FIG. 2]; and a digital image of the courier who operates the delivery vehicle 124 and will deliver the package (e.g., from their employee identification badge). The delivery security system 199 stores the notification data 190, including the expected vehicle ID 188, in the memory 127.

The communication unit 145A transmits and receives data to and from a network 105 or to another communication channel. In some embodiments, the communication unit 145A may include a DSRC transceiver, a DSRC receiver and other hardware or software necessary to make the ego vehicle 123 a DSRC-equipped device.

In some embodiments, the communication unit 145A includes a port for direct physical connection to the network 105 or to another communication channel. For example, the communication unit 145A includes a USB, SD, CAT-5, or similar port for wired communication with the network 105. In some embodiments, the communication unit 145A includes a wireless transceiver for exchanging data with the network 105 or other communication channels using one or more wireless communication methods, including: IEEE 802.11; IEEE 802.16, BLUETOOTH®; EN ISO 14906: 2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145A includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145A includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145A includes a wired port and a wireless transceiver. The communication unit 145A also provides other conventional connections to the network 105 for distribution of files or media objects using standard network protocols including TCP/IP, HTTP, HTTPS, and SMTP, millimeter wave, DSRC, etc.

In some embodiments, the communication unit 145A includes a DSRC radio 144A. The DSRC radio 144A is a hardware unit that includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band.

In some embodiments, the DSRC radio 144A includes a non-transitory memory which stores digital data that controls the frequency for broadcasting BSM messages. In some embodiments, the non-transitory memory stores a buffered version of the GPS data 186 for the parked vehicle 123 so that the GPS data 186 for the parked vehicle 123 is broadcast as an element of the BSM messages which are regularly broadcast by the DSRC radio 144A.

In some embodiments, the DSRC radio 144A includes any hardware or software which is necessary to make the parked vehicle 123 compliant with the DSRC standards. In some embodiments, the DSRC-compliant GPS unit 150 is an element of the DSRC radio 144A.

In some embodiments, the delivery security system 199 includes code and routines that are operable, when executed by the processor 125, to cause the processor 125 to execute one or more of the steps of the method 300 described below with reference to FIGS. 3A and 3B. In some embodiments, the delivery security system 199 includes code and routines that are operable, when executed by the processor 125, to cause the processor 125 to execute one or more of the steps of the method 300 described below with reference to FIGS. 3A and 3B.

In some embodiments, the delivery security system 199 of the parked vehicle 123 may be implemented using hardware including a field-programmable gate array ("FPGA") or an application-specific integrated circuit ("ASIC"). In some other embodiments, the delivery security system 199 may be implemented using a combination of hardware and software. The delivery security system 199 may be stored in a combination of the devices (e.g., servers or other devices) or parked vehicles 123.

Embodiments of the delivery security system 199 is described in more detail FIGS. 2, 3A, 3B, 4A, 4B and 5.

The server 107 is a processor based computing device. For example, the computing device may include a stand-alone hardware server. In some embodiments, the server 107 may be communicatively coupled to the network 105. The server 107 includes network communication capabilities. The server 107 is operable to send and receive wireless messages via the network 105.

As depicted, the server 107 includes the following elements: a delivery notification system 198; a vehicle ID data structure 180; a scheduled delivery data structure 181; and the notification data 190. In some embodiments, the notification data 190 is stored on the memory 127 of the parked vehicle 123, for example, after the server 107 transmits the notification data 190 to the parked vehicle 123 via the network 105.

The vehicle ID data structure 180 is a data structure (e.g., a database or any other searchable data structure) that stores digital data describing one or more expected vehicle IDs 188 for each delivery vehicle 124 operated by one or more courier services. For example, a courier service is a business that operates a fleet of vehicles such as the delivery vehicle 124 which make package deliveries in exchange for a fee, and the vehicle ID data structure 180 stores the expected vehicle IDs 188 for each of the delivery vehicles 124 included in the fleet operated by the courier service.

The scheduled delivery data structure 181 is a data structure that stores digital data describing each of the deliveries that are scheduled for any given time frame and identifies which of these deliveries will be made to destination vehicles such as the parked vehicle 123. In some embodiments, delivery of a package by a courier 103 to a destination vehicle is referred to as a "package delivery event." A destination vehicle is a parked vehicle 123 which is scheduled to receive a package delivery from a courier 103.

In some embodiments, the scheduled delivery data structure 181 includes digital data that describes how much each package weighs (e.g., the "expected weight" of the package) for each package delivery event. In some embodiments, the notification data 190 transmitted to the parked vehicle 123 via the network 105 includes digital data that describes the expected weight of the package which is being delivered to the parked vehicle 123 as part of a package delivery event.

In some embodiments, the scheduled delivery data structure 181 includes digital data that stores one or more digital images of each of the courier 103 which will be participating in a package delivery event by delivering a package to a parked vehicle 123. In some embodiments, the one or more digital images are included in the notification data 190 transmitted to the parked vehicle 123 so that the delivery security system 199 can compare these digital images included in the notification data 190 to digital images captured by the backup camera 170 in order to confirm the identity of the courier 103.

In some embodiments, the scheduled delivery data structure 181 stores any digital data which is necessary to construct the notification data 190.

The delivery notification system 198 includes code and routines that are operable, when executed by a processor of the server 107 (similar to the processor 125), to cause the processor of the server 107 to analyze the scheduled delivery data structure 181 to identify and track: (1) one or more scheduled deliveries for a given time period [i.e., a "package delivery event"]; and (2) which delivery vehicles 124 are delivering packages for the scheduled deliveries. When a scheduled delivery is being made to a destination vehicle (such as the parked vehicle 123), the delivery notification system 198 includes code and routines that are operable, when executed by a processor of the server 107, to cause the processor of the server 107 to monitor for the occurrence of this package delivery event, retrieve the expected vehicle ID 188 for the package delivery event, generate notification data 190 for the event and provide the notification data 190 to the destination vehicle (e.g., the parked vehicle 123) via the network 105 prior to the occurrence of the package delivery event an in sufficient time for the delivery security system 199 and/or the driver 104 to prepare for the package delivery event (e.g., 12 hours in advance, or some other time period).

Figure 2:
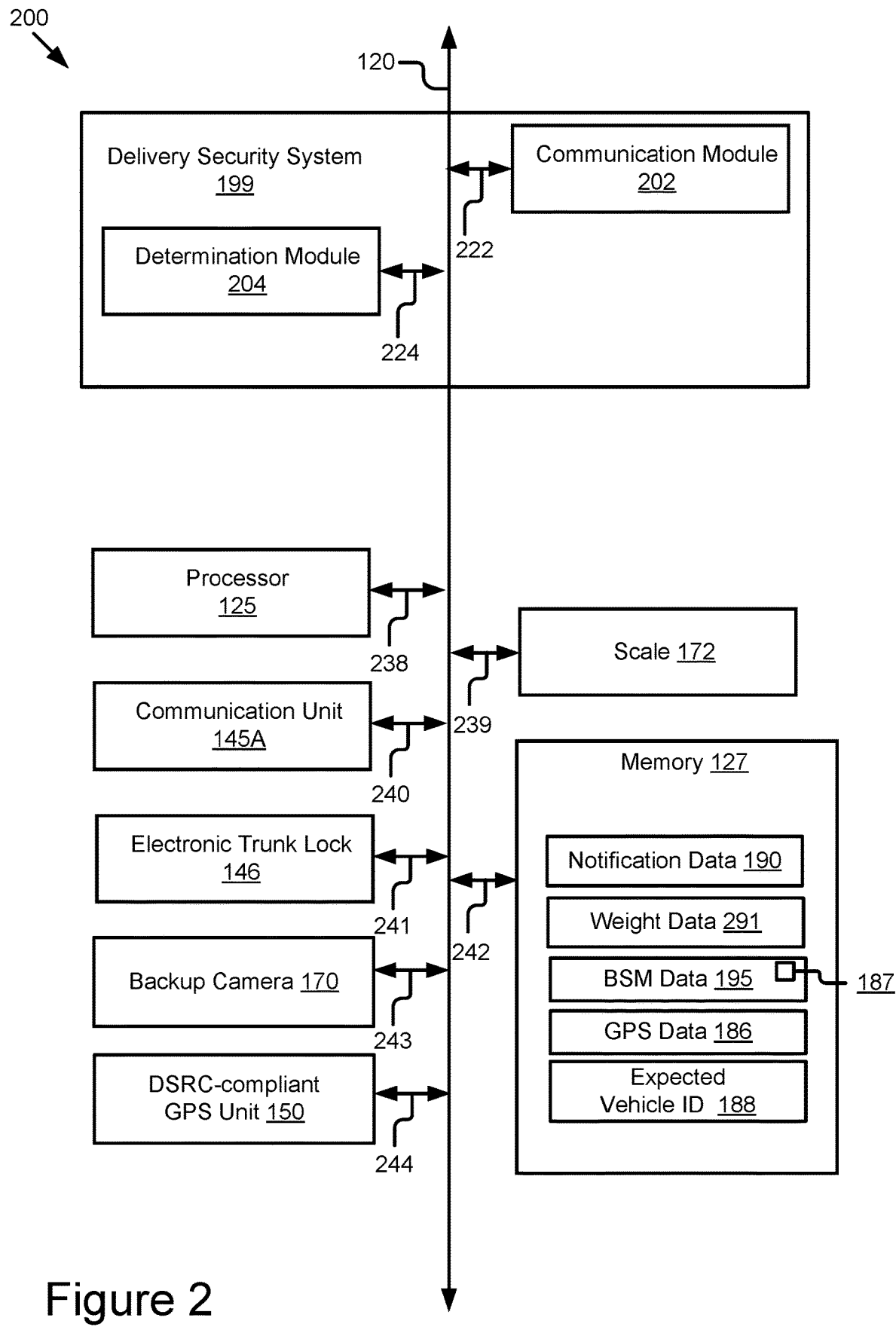
FIG. 2 is a block diagram illustrating an example computer system including the delivery security system of a parked vehicle according to some embodiments.

In some embodiments, the notification data 190 is digital data that describes one or more of the following: the expected vehicle ID 188; a time period for the delivery to the parked vehicle 123 by the delivery vehicle 124 (a time period for the package delivery event); the weight of the package being delivered to the parked vehicle 123 (which may itself be a component of the weight data 291 depicted in FIG. 2); a digital image of the courier 103 who operates the delivery vehicle 124 and will deliver the package (e.g., from the employee identification badge of the courier 103); and a license plate number of the delivery vehicle 124. In some embodiments, the scheduled delivery data structure 181 includes any digital data which is necessary to construct the notification data 190 for each of the package delivery events described by the scheduled delivery data structure 181 (with the exception that the expected vehicle IDs are stored in the vehicle ID data structure 180). The delivery notification system 198 identifies a package delivery event, builds the notification data 190 for the package delivery event and causes the server 107 to transmit the notification data 190 to the parked vehicle 123 via the network 105 prior to the time when the package delivery event is scheduled to occur. The communication unit 145A of the parked vehicle 123 receives the notification data 190 from the network 105 and the delivery notification system 198 stores the notification data 190, including the expected vehicle ID 188, in the memory 127 of the parked vehicle 123.

The delivery vehicle 124 includes one or more of the following: a communication unit 145B; a package 160; and BSM data 195.

The communication unit 145B of the delivery vehicle 124 includes elements and functionality that are similar to those described above for the communication unit 145A of the parked vehicle 123, and so, those descriptions will not be repeated here.

The communication unit 145B includes a DSRC radio 144B. The DSRC radio 144B of the delivery vehicle 124 includes elements and functionality that are similar to those described above for the DSRC radio 144A of the parked vehicle 123, and so, those descriptions will not be repeated here. The DSRC radio 144B transmits or broadcasts DSRC messages (e.g., a BSM message) which is received by the parked vehicle 123 and includes either the BSM data 195 or DSRC data which is similar to the BSM data 195.

The package 160 is an object which is being delivered by the courier 103 to the parked vehicle 123 as part of a package delivery event. The package 160 is described by the scheduled delivery data structure 181.

The BSM data 195 is the BSM data 195 which is transmitted to the parked vehicle 123 by the DSRC radio 144B of the delivery vehicle 124. The BSM data 195 is described above with reference to the parked vehicle 123, and so, that description will not be repeated here.

The driver 104 is a human operator of the parked vehicle 123. In some embodiments, the driver 104 is the addressee of the package 160 being delivered by the courier 103 to the trunk 171 of the parked vehicle 123.

The smartphone 130 is a processor-based computing device. The smartphone is operated by the driver 104. In some embodiments, the courier 103 may operator a separate smartphone referred to herein as the "smartphone 130B" in order to differentiate it from the smartphone 130 operated by the driver 104.

In some embodiments, the delivery security system 199 includes code and routines that are operable, when executed by the processor 125, to cause the processor 125 to compare the expected vehicle ID 188 to the received vehicle ID 187 to determine whether the courier 103 is authorized to access the trunk 171. If the expected vehicle ID 188 and the received vehicle ID 187 match, the delivery security system 199 includes code and routines that are operable, when executed by the processor 125, to temporarily cause the electronic trunk lock 146 to unlock so the courier 103 may access the trunk 171 to deliver the package 160.

In some embodiments, the memory 127 stores digital data received from the delivery notification system 198, as an element of the notification data 190, that specifies the weight of the package 160. In some embodiments, the delivery security system 199 includes code and routines that are operable, when executed by the processor 125, to cause the processor 125 to use the scale 172 to confirm that the weight of the package is accurate and that the courier has not removed any objects from the trunk 171 which were present in the trunk 171 prior to the electronic trunk lock 146 unlocking the trunk 171.

In some embodiments, the delivery security system 199 includes code and routines that are operable, when executed by the processor 125, to cause the processor 125 to operate the backup camera to capture images of the courier 103 as they approach the parked vehicle 123; these images may optionally be used to confirm the identity of the courier 103 (e.g., versus a known image of the courier 103 received from the delivery notification system 198 as an element of the notification data 190) or identify the courier 103 for police in the event that property of the driver 104 is missing from the trunk 171 following delivery of the package 160 to the trunk 171.

Example Computer System

Referring now to FIG. 2, depicted is a block diagram illustrating an example computer system 200 including the delivery security system 199 of a parked vehicle 123 according to some embodiments.

In some embodiments, the computer system 200 may include a special-purpose computer system that is programmed to perform one or more steps of a method 300 described below with reference to FIGS. 3A and 3B.

In some embodiments, the computer system 200 is an onboard vehicle computer of the parked vehicle 123. In some embodiments, the computer system 200 is an onboard unit of the parked vehicle 123. In some embodiments, the computer system 200 is an ECU, head unit or some other processor-based computing device of the parked vehicle 123.

The computer system 200 may include one or more of the following elements according to some examples: the delivery security system 199; the processor 125; the memory 127; the communication unit 145A; the electronic trunk lock 146; the backup camera 170; the DSRC-compliant GPS unit 150; and the scale 172. The components of the computer system 200 are communicatively coupled by a bus 120.

In the illustrated embodiment, the processor 125 is communicatively coupled to the bus 120 via a signal line 238. The scale 172 is communicatively coupled to the bus 120 via a signal line 239. The communication unit 145A is communicatively coupled to the bus 120 via a signal line 240. The electronic trunk lock 146 is communicatively coupled to the bus 120 via a signal line 241. The memory 127 is communicatively coupled to the bus 120 via a signal line 242. The backup camera 170 is communicatively coupled to the bus 120 via a signal line 243. The DSRC-compliant GPS unit 150 is communicatively coupled to the bus 120 via a signal line 244.

The following elements of the computer system 200 were described above with reference to FIG. 1, and so, those descriptions will not be repeated here: the delivery security system 199; the processor 125; the memory 127; the communication unit 145A; the electronic trunk lock 146; the backup camera 170; the DSRC-compliant GPS unit 150; and the scale 172.

The memory 127 may store any of the data described above with reference to FIG. 1. The memory 127 may store any data needed for the computer system 200 to provide its functionality.

As illustrated, the memory 127 stores: the notification data 190; the weight data 291; the BSM data 195; the GPS data 186; and the expected vehicle ID 188. These elements were described above with reference to FIG. 1, and so, there descriptions will not be repeated here: the notification data 190; the BSM data 195; the GPS data 186; and the expected vehicle ID 188 notification data 190 was described above with reference to FIG. 1, and so, that description will not be repeated here.

The weight data 291 is digital data that describes: (1) an expected weight for a package which is being delivered to the parked vehicle 123; (2) a weight of the tangible objects in the trunk prior to the package being delivered to the parked vehicle 123: and (3) a weight of the tangible objects in the trunk after the packaged is delivered to the parked vehicle 123.

In the illustrated embodiment shown in FIG. 2, the delivery security system 199 includes a communication module 202 and a determination module 204.

Figure 5:
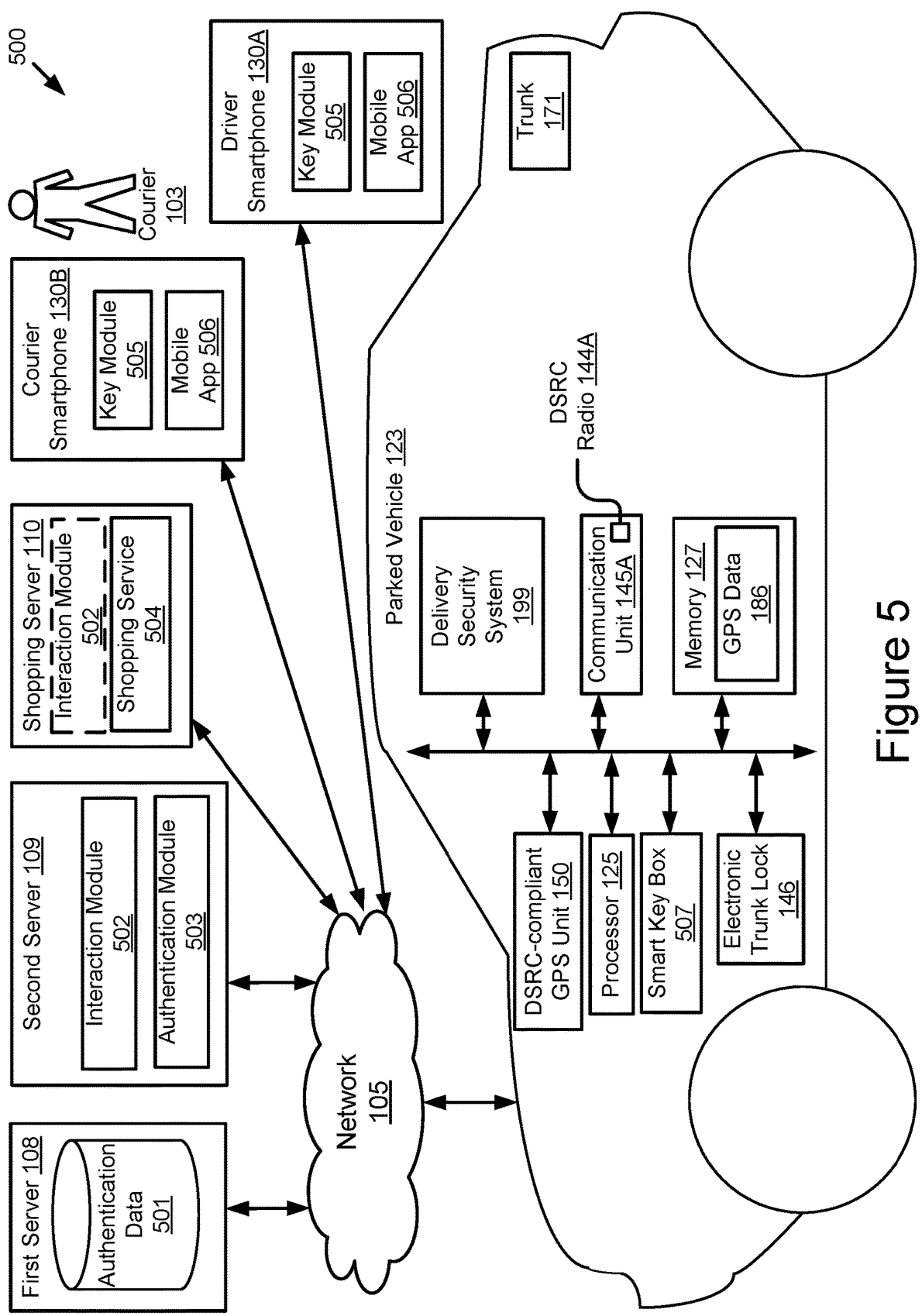
FIG. 5 is a block diagram illustrating an operating environment for a delivery security system according to some embodiments.

The communication module 202 can be software including routines for handling communications between the delivery security system 199 and other components of the computer system 200 or one or more of the operating environment 100 of FIG. 1 and the operating environment 500 of FIG. 5. In some embodiments, the communication module 202 can be a set of instructions executable by the processor 125 to provide the functionality described below for handling communications between the delivery security system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145A, to and from one or more elements of the operating environment 100 or the operating environment 500. For example, the communication module 202 receives or transmits, via the communication unit 145A, one or more types of digital data stored on the memory 127. The communication module 202 may send or receive any of the data or messages described above with reference to FIG. 1, or below with reference to FIGS. 3A, 3B, 4 and 5, via the communication unit 145A.

In some embodiments, the communication module 202 receives data from components of the delivery security system 199 and stores the data in the memory 127 (or a buffer or cache of the memory 127). For example, the communication module 202 receives the notification data 190 described above with reference to FIG. 1 from the communication unit 145A and stores the notification data 190 in the memory 127 (or a buffer or cache of the memory 127).

In some embodiments, the communication module 202 may handle communications between components of the delivery security system 199. For example, the communication module 202 transmits the notification data 190 to the determination module 204.

The determination module 204 can be software including routines for monitoring for an expected vehicle ID 188 included in an instance of notification data 190 by receiving DSRC messages (e.g., BSM messages) and parsing out the received vehicle ID 187 included in these DSRC messages (e.g., as an element of the BSM data 195 or DSRC data similar to the BSM data 195) and comparing the received vehicle ID 187 to the expected vehicle ID 188 to determine whether an expected delivery vehicle 124 is within DSRC range of the parked vehicle 123 (e.g., within 300 to 500 meters) such that a presence of a courier 103 who operates the delivery vehicle 124 is authenticated by the comparison of the received vehicle ID 187 and the expected vehicle ID 188. In some embodiments, the determination module 204 can be a set of instructions executable by the processor 125 which, when executed by the processor 125, cause the processor 125 to execute one or more of the steps of the method 300 described below with reference to FIG. 3 or the functionality of the delivery security system 199 described below with reference to FIG. 5.

In some embodiments, the determination module 204 can be stored in the memory 127 of the computer system 200 and can be accessible and executable by the processor 125. The determination module 204 may be adapted for cooperation and communication with the processor 125 and other components of the computer system 200 via signal line 224.

Example Methods

Figure 3B:
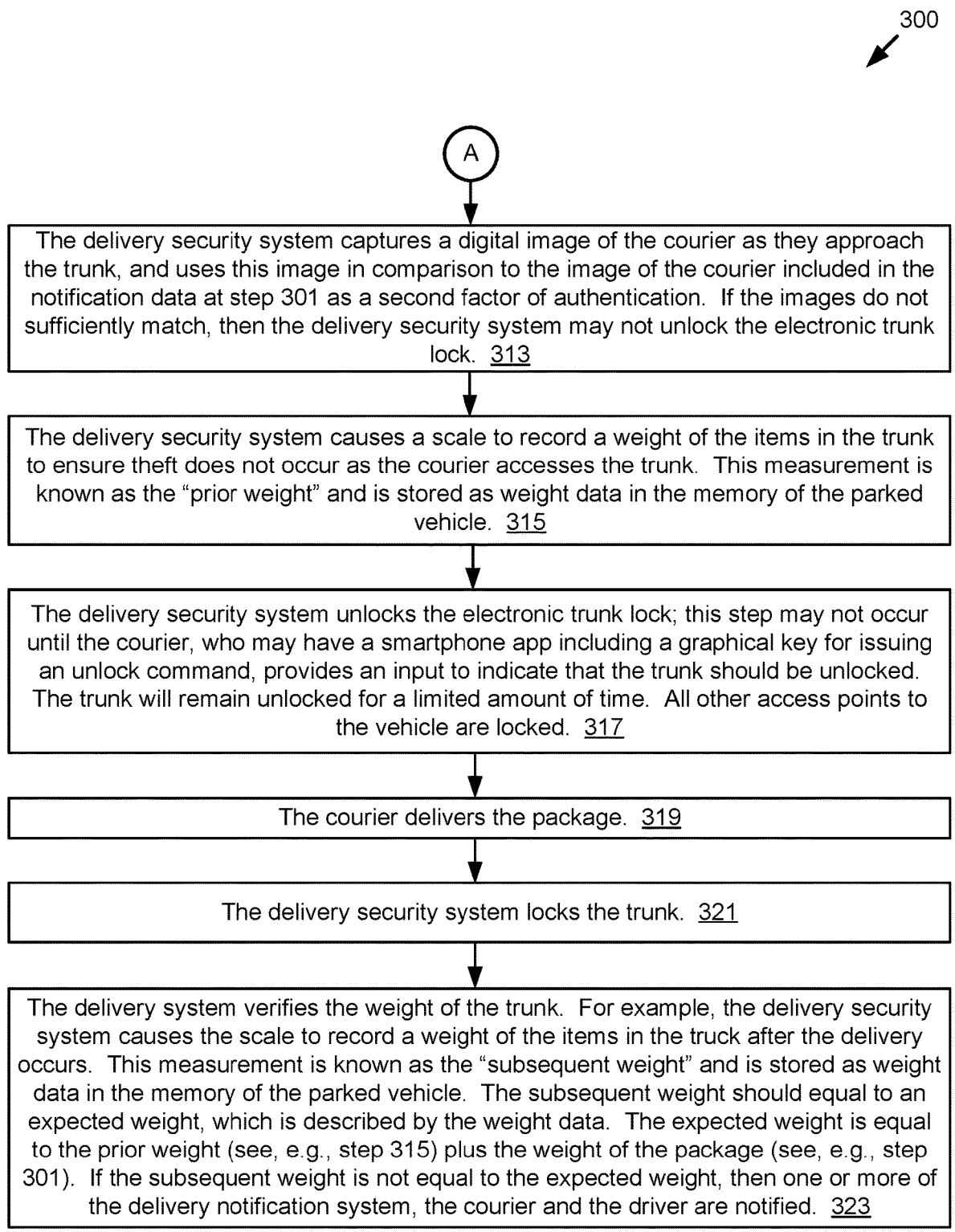

Referring now to FIGS. 3A and 3B, depicted is a method 300 for opening a trunk of a parked vehicle responsive to receipt of a DSRC message (e.g., a BSM message) including an identifier of a second vehicle (e.g., the delivery vehicle), according to some embodiments.

One or more of the steps described herein for the method 300 may be executed by one or more computer systems 200.

At step 301, a delivery notification system transmits a wireless message to a network. The wireless message includes the notification data and describes a package delivery event. A communication unit of a parked vehicle receives the wireless message from the network. The parked vehicle may not be parked at the time that the wireless message including the notification data is received. Instead, the parked vehicle is referred to as a parked vehicle to indicate that it is parked at the time a package is delivered to the parked vehicle.

At step 303, the delivery security system notifies the delivery notification system about the location of the parked vehicle at the time of the delivery so that the courier can more easily locate the parked vehicle. This notification can be, for example, by email or text message to the courier's smartphone, or a wireless message which is transmitted to the network and received by the delivery notification system, which subsequently notifies the courier of the location of the parked vehicle.

At step 305, the delivery security system notifies the delivery notification system about the license plate number of the parked vehicle so that the courier can verify the identity of the parked vehicle by looking at the license plate of the parked vehicle.

At step 307, the delivery security system monitors for DSRC messages (e.g., BSM messages) from the delivery vehicle.

At step 308, the delivery security system receives a BSM message from the delivery vehicle.

At step 309, the delivery security system parses the received vehicle ID from the BSM data. Optionally, the delivery security system parses the GPS data and timestamp data for the delivery vehicle from the BSM data; this information may be used to further verify the identity of the delivery vehicle from the BSM data. For example, the actual latitude and longitude of the delivery vehicle at a specified time may be known and provided by the delivery notification system to the delivery security system (e.g., as an element of the notification data), and this may be compared to the GPS data and timestamp data included in the BSM message as an additional layer of authentication to secure the parked vehicle.

At step 311, the delivery security system compares the received vehicle ID to the expected vehicle ID, and if they match, the delivery security system authenticates the courier as being present for the package delivery event described in the wireless message received at step 301. As described below, the method 300 may include additional factors of authentication which are required prior to the trunk being unlocked.

Referring now to FIG. 3B, at step 313 the delivery security system captures a digital image of the courier as they approach the trunk, and uses this image in comparison to the image of the courier received in the notification data as a second factor of authentication of the courier. If the images do not sufficiently match, then the delivery security system may not unlock the electronic trunk lock.

At step 315, the delivery security system causes a scale of the parked vehicle to record a weight of the items in the trunk to ensure theft does not occur as the courier accesses the trunk. This measurement is known as the "prior weight" and is stored as weight data in the memory of the parked vehicle.

At step 317, the delivery security system unlocks the electronic trunk lock; this step may not occur until the courier, who may have a smartphone app including a graphical key for issuing an unlock command which is receivable by the delivery security system, provides an input to indicate that the trunk should be unlocked. The trunk will remain unlocked for a limited amount of time. All other access points to the vehicle are locked when the trunk is unlocked.

At step 319, the courier delivers the package.

At step 321, the delivery security system locks the trunk.

At step 323, the delivery system verifies the weight of the trunk. For example, the delivery security system causes the scale to record a weight of the items in the truck after the delivery occurs at step 319. This measurement is known as the "subsequent weight" and is stored as weight data in the memory of the parked vehicle. The subsequent weight should equal to an expected weight, which is described by the weight data. The expected weight is equal to the prior weight (see, e.g., step 315) plus the weight of the package (see, e.g., step 301). If the subsequent weight is not equal to the expected weight, then one or more of the delivery notification system, the courier and the driver are notified.

Referring now to FIG. 4A, depicted is a block diagram illustrating an example of the BSM data 195 according to some embodiments.

The regular interval for transmitting BSMs may be user configurable. In some embodiments, a default setting for this interval may be transmitting the BSM every 0.10 seconds or substantially every 0.10 seconds.

A BSM is broadcasted over the 5.9 GHz DSRC band. DSRC range may be substantially 1,000 meters. In some embodiments, DSRC range may include a range of substantially 100 meters to substantially 1,000 meters. DSRC range is generally 300 to 500 meters depending on variables such as topography and occlusions between DSRC-equipped endpoints.

Referring now to FIG. 4B, depicted is a block diagram illustrating an example of BSM data 195 according to some embodiments.

A BSM may include two parts. These two parts may include different BSM data 195 as shown in FIG. 4B.

Part 1 of the BSM data 195 may describe one or more of the following: the GPS data of the vehicle; vehicle heading; vehicle speed; vehicle acceleration; vehicle steering wheel angle; and vehicle size.

Part 2 of the BSM data 195 may include a variable set of data elements drawn from a list of optional elements. Some of the BSM data 195 included in Part 2 of the BSM are selected based on event triggers, e.g., anti-locking brake system ("ABS") being activated may trigger BSM data 195 relevant to the ABS system of the vehicle.

In some embodiments, some of the elements of Part 2 are transmitted less frequently in order to conserve bandwidth.

In some embodiments, the BSM data 195 included in a BSM includes current snapshots of a vehicle.

Referring now to FIG. 5, depicted is a block diagram illustrating an operating environment 500 for a delivery security system 199 according to some embodiments. As depicted, the operating environment 500 includes the following elements: a first server 108; a second server 109; a shopping server 110; a parked vehicle 123; a courier smartphone 130B of a courier 103; and a driver smartphone 130A of a driver of the parked vehicle 123. These elements of the operating environment 500 are communicatively coupled to one another via the network 105.

In the depicted embodiment, the delivery security system 199 beneficially provides a secure way to enable e-commerce sites (e.g., the shopping service 504) to act as a courier and deliver packages to a parked vehicle 123 without providing the courier 103 with a physical key to the parked vehicle 123.

The following elements of the operating environment 500 were described above with reference to FIG. 1, and so, their descriptions will not be repeated here: the network 105; the parked vehicle 123; the driver smartphone 130A; the courier smartphone 130B; and the courier 103.

In some embodiments, the courier smartphone 130B includes a DSRC radio 144 similar to the one which is included in the parked vehicle 123. In this way, the courier smartphone 130B is operable to send and receive DSRC messages with the parked vehicle 123 and other DSRC-equipped devices.

The first server 108 is a processor based computing device. For example, the computing device may include a standalone hardware server. In some embodiments, the first server 108 is communicatively coupled to the network 105. The first server 108 includes network communication capabilities. The first server 108 is operable to send and receive wireless messages via the network 105.

The first server 108 provides an authentication service using the authentication data 501. For example, the authentication data 501 describes a known geographic location of the parked vehicle 123 based on the GPS data 186 of the parked vehicle 123. In some embodiments, the GPS data 186 is transmitted to the network 105 by the delivery security system 199 and received by the first server 108 and stored as an element of the authentication data 501. For example, the first server 108 is a trusted entity that is trusted by the parked vehicle 123. The first server 108 includes code and routines that are operable, when executed by a processor of the first server 108, to provide the authentication servicing using the authentication data 501. The authentication service is described in more detail below.

The shopping server 110 is a processor based computing device. For example, the computing device may include a standalone hardware server. In some embodiments, the shopping server 110 is communicatively coupled to the network 105. The shopping server 110 includes network communication capabilities. The shopping server 110 is operable to send and receive wireless messages via the network 105.

The shopping server 110 includes a shopping service 504. The shopping service 504 includes code and routines that are operable, when executed by a processor of the shopping server 110, to provide an online platform for individuals, such as the driver of the parked vehicle, to buy items which can then be delivered to the private vehicles of these individuals, such as the parked vehicle 123. This online platform may be referred to herein as an "electronic-commerce site" or an "e-commerce site." The shopping server 110 is operated by an entity which is in the business of providing the e-commerce site to customers (such as the driver 104 of the parked vehicle 123) who then use the e-commerce site to purchase items which are then shipped to them by the courier 103.

The second server 109 is a processor based computing device. For example, the computing device may include a standalone hardware server. In some embodiments, the second server 109 is communicatively coupled to the network 105. The second server 109 includes network communication capabilities. The second server 109 is operable to send and receive wireless messages via the network 105.

The second server 109 provides an authentication service that authenticates the shopping service 504 to the delivery security system 199. As depicted, the second server 109 includes an interaction module 502 and an authentication module 503. The interaction module 502 and the authentication module 503 cooperate to provide the authentication service of the second server 109.

The interaction module 502 includes code and routines that are operable, when executed by a processor of the second server 109, to that enable the shopping server 110 to communicate with the second server 109 via the network 105. In some embodiments, the shopping service 504 also includes an interaction module 502 which is integrated into the frontend customer-facing portion of the shopping service 504 and the backend delivery service portion of the shopping service 504. The inclusion of the interaction module 502 in both the second server 109 and the shopping server 110 enables these two entities to wirelessly communicate with one another via the network 105. For example, the second server 109 includes secure architecture and other conventional security mechanisms which would prevent the shopping server 110 from wirelessly communicating with it if it did not include the interaction module 502.

In some embodiments, the interaction module 502 of the second server 109 and the interaction module 502 of the shopping server 110 creates a secure tunnel through which wireless communications occur between the second server 109 and the shopping server 110. This secure tunnel is used for transmitting sensitive information such as the GPS data 186 of the parked vehicle 123, which itself is transmitted to the second server 109 by either the first server 108 or the parked vehicle 123 via the network 105 in such a way that the shopping server 110 is only provided a momentary snapshot of the geographical location of the parked vehicle 123 which is limited in scope to the geographical location of the parked vehicle 123 at the time when a package is to be delivered to the parked vehicle 123. One or more of the second server 109 and the shopping server 110 then provide this snapshot (i.e., the GPS data 186) to the smartphone 130B of the courier 103.

The authentication module 503 includes code and routines that are operable, when executed by a processor of the second server 109, to provide the shopping service 504 with access to the GPS data 186 of the parked vehicle 123 so long as the driver of the parked vehicle 123 provides permission to share the GPS data 186 with the shopping service 504 as part of a buying experience whereby the driver purchases an item from the shopping service 504 and selects to have this item delivered to their parked vehicle 123, which requires providing the shopping service 504 with limited access to GPS data 186 for the parked vehicle 123 at a time for the delivery of the purchased item and with sufficient security precautions to guarantee the safety of the driver and the parked vehicle 123. The authentication module 503 also enables the driver of the parked vehicle 123 to set different levels of permission for the shopping service 504. At no point can the GPS data 186 be shared with the shopping service 504 without the permission of the driver to share this GPS data 186 for a limited amount of time, and the GPS data 186 is always limited in scope to the snapshot of geographical location information which is needed to make a successful delivery of the purchased item to the parked vehicle 123. The shopping service 504 cannot be provided with ongoing access to the GPS data 186 of the parked vehicle 123 before or after the time for the delivery of the purchased item (which is delivered, for example, as a package).

The parked vehicle 123 includes a smart key box 507. The smart key box 507 is code and routines which are operable, when execute by the processor 125 of the parked vehicle 123, to provide access to the parked vehicle 123 if one or more conditions are met. For example, the smart key box 507 enables the parked vehicle 123 to be accessed by any person who has a key fob that is paired with the smart key box at the factory where the parked vehicle 123 is manufactured or at a dealership which is authorized by the manufacturer of the parked vehicle 123 to sell vehicles such as the parked vehicle 123. For example, if a driver of the parked vehicle 123 has their key fob in their pocket, then the communication unit 145A of the parked vehicle 123 detects a wireless signal transmitted or broadcast by the key fob. The wireless signal includes digital data that describes a secure digital key. The communication unit 145A provides the digital data to the smart key box 507 and the smart key box 507 compares the digital data to a stored copy of the secure digital key (which is encoded in the smart key box 507 when the key fob is paired with the smart key box 507) to determine whether the digital data described a secure digital key which matches the version of the secure digital key which is stored in the non-transitory memory of the smart key box 507 (e.g., the memory 127). If a match is found, then the smart key box 507 provides access to the parked vehicle 123 (e.g., unlocking the trunk 171, unlocking a door, etc.). The delivery security system 199 beneficially provides a new way to leverage the smart key box 507 so that couriers 103 can deliver packages to the parked vehicle 123 even though they do not have a key fob which is paired with the parked vehicle 123.

The courier smartphone 130B and the driver smartphone 130A each include a key module 505. The key module 505 is software which is operable, when executable by a processor (e.g., of the courier smartphone 130B), to cause the processor to wirelessly communicate with the delivery security system 199 via the communication unit 145A of the parked vehicle 123 to cause the parked vehicle 123 to be unlocked even though the courier 103 does not have a key fob which is paired with the parked vehicle 123.

For example, the courier smartphone 130B includes a mobile application 506 which provides a front end interface that enables the courier 103 to use the key module 505 even though the courier 103 may not be aware of the existence of the key module 505. The mobile application 506 generates a graphical user interface which includes inputs which allow the courier 103 to request the trunk 171 to be opened so that a packaged can be delivered to the parked vehicle 123. Responsive to this input, the mobile application 506 causes the courier smartphone 130B to transmit a wireless signal (e.g., DSRC, cellular, etc.) that includes a secure digital key which is securely stored in the key module 505. In some embodiments, one or more of the secure digital key and the key module 505 are temporarily provided to the courier smartphone 130B via the network 105 for the limited purpose of making a delivery to the parked vehicle 123. In some embodiments, the secure digital key is the same as the secure digital key which would be included in the wireless communication transmitted or broadcast by a key fob which is paired with the parked vehicle 123. In this way, the combination of the key module 505 and the mobile application 506 cooperating with one another provide a virtualized version of the real-world key fob which is paired with the parked vehicle 123 in the real-world. The communication unit 145A receives the wireless signal transmitted by the courier smartphone 130B and provides digital data describing the secure digital key to the delivery security system 199. In this embodiment, the delivery security system 199 includes code and routines that are operable, when executed by the processor 125, to cause the processor 125 to provide the digital data to the smart key box 507 and, if necessary, provide other electronic signal that spoof the presence of a key fob. The smart key box 507 then analyzes the secure digital key provided to it by the delivery security system 199 in its normal manner. In this way, the delivery security system 199 adds new functionality to the smart key box 507 so that the smart key box 507 is secured such that only a key fob which is paired with the parked vehicle 123 and a processor-based computing device including the key module 505 can provide a wireless signal to the communication unit 145A and cause the trunk 171 to unlock.

Accordingly, the delivery security system 199 beneficially enables a courier 103 to securely access a parked vehicle 123 to deliver packages to the parked vehicle 123 when the driver of the parked vehicle 123 has requested and authorized a package to be delivered to the parked vehicle 123. The driver 104 is provided with a graphical user interface that they can use to give permission for deliveries to the parked vehicle 123 (during the checkout process when buying an item using the e-commerce site) and select different levels of access for different deliveries (e.g., maybe a package is larger than others, and so, it is delivered to the backseat of the parked vehicle 123 instead of the trunk 171).

The functionality of the delivery security system 199 in the context of the smart key box 507 and key module 505 is now described from the perspective of the driver 104 of the parked vehicle 123, according to some embodiments.

At a first step, the driver 104 purchases a product on an e-commerce site which is provided by the shopping service 504. In other words, the driver 104 of the parked vehicle 123 is a customer of the e-commerce site provided by the shopping service 504 and hosted by the shopping server 110. The checkout process includes a step where the driver 104 has an option to choose to have their product delivered to their parked vehicle 123 so long as their parked vehicle 123 is equipped with a smart key box 507. This step is enabled, in part, by the interaction module 502 which operates on the second server 109. The interaction module 502 is code and routines that are operable, when executed by the processor of the second server 109, to cause the processor to enable the shopping service 504 to communicate with the first server 108 through the second server 109. Using the second server 109 as an intermediary in this way is beneficial, for example, because the second server 109 is trusted by both the first server 108 (which is operated by the manufacturer of the parked vehicle 123) and the shopping server 110 (which is operated by the e-commerce business). The second server 109 also includes the authentication module 503 which enables authentication of drivers 104 of the parked vehicle 123 (which was manufactured by the operator of the first server 108) and also enables these drivers 104 to set different permission levels for accessing their GPS data 186.

At a second step, the driver 104 of the parked vehicle 123 selects, during the checkout process, an option to have their purchased product delivered to the parked vehicle 123. After this selection is made, a wireless communication process is established through the second server 109 between the shopping service 504 and the first server 108; this wireless communication process includes the first server 108 checking to ensure that the driver 104 has established sufficient permission levels for enabling delivery to their parked vehicle 123. This wireless communication process also establishes a temporary association between the parked vehicle 123 and the delivery of a package that includes the product(s) that the driver 104 has purchased from the shopping service 504.

At a third step, when the package is going to be delivered, the courier 103 uses a processor-based computing device to retrieve the GPS data 186 for the parked vehicle 123 of the driver 104 who made the purchase in the first step and the second step. The courier 103 then determines the identity of a delivery vehicle 124 whose route includes or is proximate to the geographic location of the parked vehicle 123 as described by the GPS data 186.

At a fourth step, a package is dispatched in the delivery vehicle 124 whose route includes or is proximate to the geographic location of the parked vehicle 123.

At a fifth step, the delivery vehicle 124 drives to the geographic location of the parked vehicle 123. The delivery vehicle 124 is driven by the courier 103.

At a sixth step, the courier 103 has a smartphone 130B (or some other portable computing device) including a mobile application 506 and the key module 505 installed and operable on the smartphone 130B. The key module 505 is secure software which is operable to wirelessly communicate with the second server 109 whose interaction module 502 wirelessly communications with the first server 108. This process enables: (1) the courier 103 to identify the exact geographic location of the parked vehicle 123 and (2) the trunk 171 of the parked vehicle 123 to temporarily be accessible by the courier 103 for a limited period of time for the purpose of delivering the package. As a result, for a limited period of time when the courier 103 is within DSRC range of the parked vehicle 123, the trunk 171 of the parked vehicle 123 (or some other access point to the car's interior such as a particular door or window) will open as though the courier 103 had a key fob which was paired with the smart key box 507 of the parked vehicle 123. Optionally, the driver 104 may receive a text message or some other notification that requires their positive response to authorize the courier 103 to be able to have limited access to the parked vehicle 123 for a limited amount of time.

At the seventh step, the package is delivered to the parked vehicle 123. The driver 104 may receive a notification on their smartphone (e.g., a text message) that notifies them of the delivery.

The functionality of the delivery security system 199 in the context of the smart key box 507 and key module 505 is now described from the perspective of the shopping service 504, according to some embodiments. The numbering of the steps now begins again. The numbering of these steps is not necessarily related to similarly numbered steps as described above from the perspective of the driver 104.

At a first step, the shopping service 504 integrates the interaction module 502 into their frontend customer facing application and backend delivery service application.

At a second step, the driver 104 shops on the e-commerce site provided by the shopping service 504. During the checkout process, the driver 104 selects the option to have their package delivered to their parked vehicle 123.

At a third step, the driver 104 authorizes the courier 103 to access the parked vehicle 123 for a limited amount of time for the purpose of delivering a package to the parked vehicle 123. This step includes, for example, the driver 104 authorizing the courier 103 to temporarily access the GPS data 186 of their parked vehicle 123.

At a fourth step, the courier 103 uses their smartphone 130B to access the GPS data 186 of the parked vehicle 123 for the limited purpose of delivering a package to the parked vehicle 123.

At a fifth step, the courier 103 can now access the GPS data 186 of the parked vehicle 123.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
   receiving, by a first vehicle, a wireless message from a delivery notification system that includes an expected identifier and a time period for delivery to the first vehicle;
   receiving, from a second vehicle, a basic safety message (BSM) that includes a unique identifier of the second vehicle;
   responsive to determining a match between the unique identifier from the BSM to the expected identifier from the wireless message, unlocking, by an electronic trunk lock of the first vehicle, a trunk of the first vehicle for a predetermined amount of time, based on the time period for delivery; and
   measuring, by a scale in the first vehicle, a subsequent weight of a package placed in the trunk of the first vehicle.

2. The method of claim 1, wherein the wireless message further includes an expected weight of the package and further comprising:
   determining that a difference exists between (a) the expected weight of the package and an object weight of one or more tangible objects in the trunk prior to the package being delivered and (b) a total weight of the package and the object weight; and
   responsive to the difference occurring, transmitting an electronic message to a delivery security system that compares the subsequent weight to an expected weight.

3. The method of claim 1, wherein the second vehicle is an autonomous vehicle.

4. The method of claim 1, wherein the second vehicle is a delivery vehicle.

5. The method of claim 1, wherein the first vehicle is parked and further comprising transmitting, by the first vehicle, global positioning system data that describes a location of the first vehicle with space-level accuracy.

6. The method of claim 1, further comprising transmitting, by the first vehicle, a location of the first vehicle with space-level accuracy.

7. The method of claim 1, wherein the wireless message further includes a digital image of a courier delivering the package and further comprising:
   capturing, by a backup camera of the first vehicle, a digital image of a driver of the second vehicle; and
   determining a match between the digital image of the courier and the digital image of the driver of the second vehicle, wherein unlocking the electronic trunk lock is further responsive to determining the match.

8. The method of claim 1, wherein the first vehicle is parked.

9. The method of claim 2, wherein responsive to the subsequent weight being different from the expected weight, a notification is sent to one or more of a delivery notification system, a courier, and a driver.

10. The method of claim 1, further comprising transmitting a second message to a computing device of a driver of the second vehicle to cause the computing device to provide a notification to the driver that the trunk is unlocked.

11. A system comprising:
    a first radio of a first vehicle;
    an electronic trunk lock operable to lock and unlock a trunk of the first vehicle; and
    an onboard unit of the first vehicle that is communicatively coupled to the first radio and the electronic trunk lock, the onboard unit including a non-transitory memory storing computer code which, when executed by the onboard unit causes the onboard unit to execute steps comprising:
       receiving, by the first radio, a wireless message from a delivery notification system that includes an expected identifier and a time period for delivery to the first vehicle;
       receiving, from a second vehicle, a basic safety message (BSM) that includes a unique identifier of the second vehicle;
       responsive to determining a match between the unique identifier from the BSM to the expected identifier from the wireless message, providing instructions to the electronic trunk lock to unlock the trunk of the first vehicle for a predetermined amount of time, based on the time period for delivery; and measuring, by a scale in the first vehicle, a weight of a package placed in the trunk of the first vehicle.

12. The system of claim 11, wherein the BSM is transmitted by a second radio of the second vehicle.

13. The system of claim 11, wherein the second vehicle is a delivery vehicle.

14. The system of claim 11, wherein the first vehicle is parked and further comprising additional computer code stored on the non-transitory memory which, when executed by the onboard unit causes the onboard unit to execute additional steps comprising transmitting, by the first radio, global positioning system data that describes a location of the first vehicle with space-level accuracy.

15. The system of claim 11, further comprising additional computer code stored on the non-transitory memory which, when executed by the onboard unit causes the onboard unit to execute additional steps comprising transmitting, by the first radio, a location of the first vehicle with space-level accuracy.

16. A non-transitory memory encoded with a computer program, the computer program comprising instructions that, when executed by one or more processors, cause the one or more processors to perform operations comprising:
 receiving, by a first vehicle, a wireless message from a delivery notification system that includes an expected identifier and a time period for delivery to the first vehicle;
 receiving, from a second vehicle, a basic safety message (BSM) that includes a unique identifier of the second vehicle;
 responsive to determining a match between the unique identifier from the BSM to the expected identifier from the wireless message receiving the BSM, providing instructions to an electronic trunk lock of the first vehicle to unlock a trunk of the first vehicle for a predetermined amount of time, based on the time period for delivery; and
 measuring, by a scale in the first vehicle, a weight of a package placed in the trunk of the first vehicle.

17. The non-transitory memory of claim 16, wherein the second vehicle is a delivery vehicle.

18. The non-transitory memory of claim 17, wherein the second vehicle is an autonomous vehicle.

19. The non-transitory memory of claim 16, wherein the first vehicle is parked and additional instructions stored on the non-transitory memory which, when executed by the one or more processors causes the one or more processors to execute additional operations comprising transmitting, by the first vehicle, global positioning system data that describes a location of the first vehicle with space-level accuracy.

20. The non-transitory memory of claim 19, further comprising additional instructions stored on the non-transitory memory which, when executed by the one or more processors causes the one or more processors to execute additional operations comprising transmitting, by the first vehicle, a location of the first vehicle with space-level accuracy.

* * * * *